(12) United States Patent
Schia

(10) Patent No.: US 12,366,132 B2
(45) Date of Patent: Jul. 22, 2025

(54) SINGLE LINE QUICK CONNECTOR (SQC), A SYSTEM COMPRISING THE SINGLE LINE QUICK CONNECTOR AND METHOD OF OPERATING

(71) Applicant: FMC Kongsberg Subsea AS, Kongsberg (NO)

(72) Inventor: Jon Olav Schia, Notodden (NO)

(*) Notice: Subject to any disclaimer, the term of this patent is extended or adjusted under 35 U.S.C. 154(b) by 126 days.

(21) Appl. No.: 17/916,324

(22) PCT Filed: Mar. 24, 2021

(86) PCT No.: PCT/EP2021/057562
§ 371 (c)(1),
(2) Date: Sep. 30, 2022

(87) PCT Pub. No.: WO2021/197962
PCT Pub. Date: Oct. 7, 2021

(65) Prior Publication Data
US 2023/0151708 A1    May 18, 2023

(30) Foreign Application Priority Data
Mar. 30, 2020   (NO) .................................. 20200379

(51) Int. Cl.
*E21B 33/035*   (2006.01)
*E21B 41/04*    (2006.01)
*F16L 37/091*   (2006.01)

(52) U.S. Cl.
CPC .......... *E21B 33/0387* (2020.05); *E21B 41/04* (2013.01); *F16L 37/0915* (2016.05)

(58) Field of Classification Search
CPC .... E21B 33/0387; E21B 41/04; F16L 37/002; F16L 37/121; F16L 37/122
See application file for complete search history.

(56) References Cited

U.S. PATENT DOCUMENTS

| | | | | |
|---|---|---|---|---|
| 4,506,863 A | * | 3/1985 | Quin | F16L 37/002 |
| 4,770,250 A | * | 9/1988 | Bridges | F16L 37/002 |
| 5,941,574 A | | 8/1999 | Hamilton et al. | |
| 9,163,486 B2 | | 10/2015 | Lugo | |
| 2017/0328164 A1 | | 11/2017 | Partridge et al. | |
| 2018/0058181 A1 | * | 3/2018 | Salomonsen | E21B 33/0387 |

FOREIGN PATENT DOCUMENTS

| | | |
|---|---|---|
| GB | 2 433 565 A | 6/2007 |
| WO | WO 2017/222560 A1 | 12/2017 |
| WO | WO 2019/117718 A1 | 6/2019 |

* cited by examiner

*Primary Examiner* — Zachary T Dragicevich

(57) ABSTRACT

A single line quick connector includes an outer housing, a screw element, a collet sleeve having a plurality of collet fingers, and a fluid line insert. The fluid line insert is connectable to a fluid line and has a groove for a coupler. The outer housing, the screw element and the collet sleeve are arranged such that rotation of the screw element results in an axial movement of the outer housing relative the collet sleeve, and thus the collet fingers. The outer housing has a radial through-going opening, and the collet sleeve has at least one recess between neighboring collet fingers. The through-going opening and the recess are configured such that, when connected, the fluid line insert extends radially through the through-going opening and the at least one recess.

13 Claims, 8 Drawing Sheets

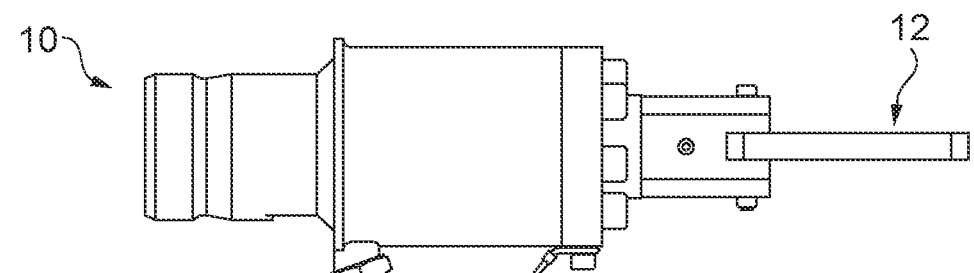
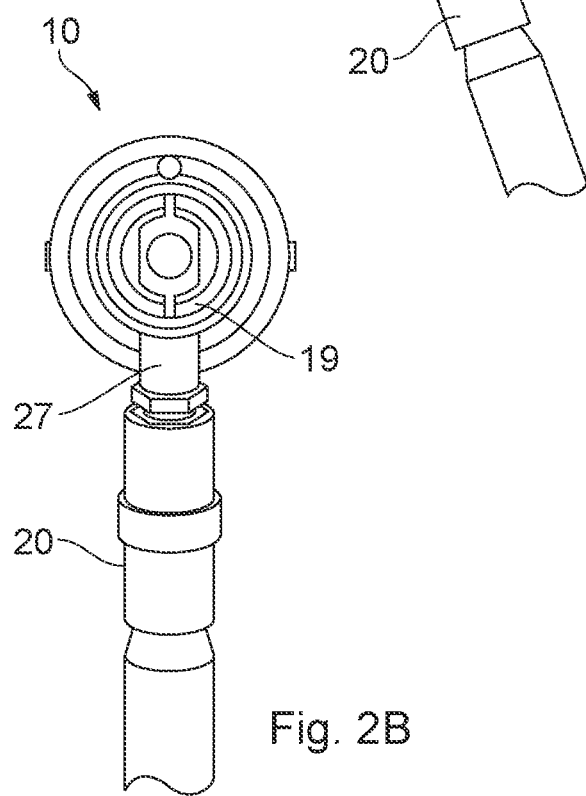
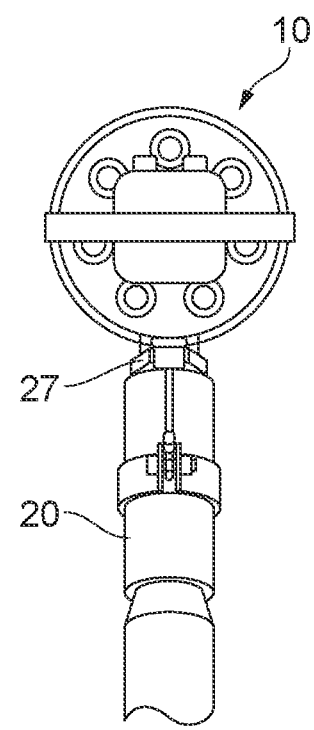
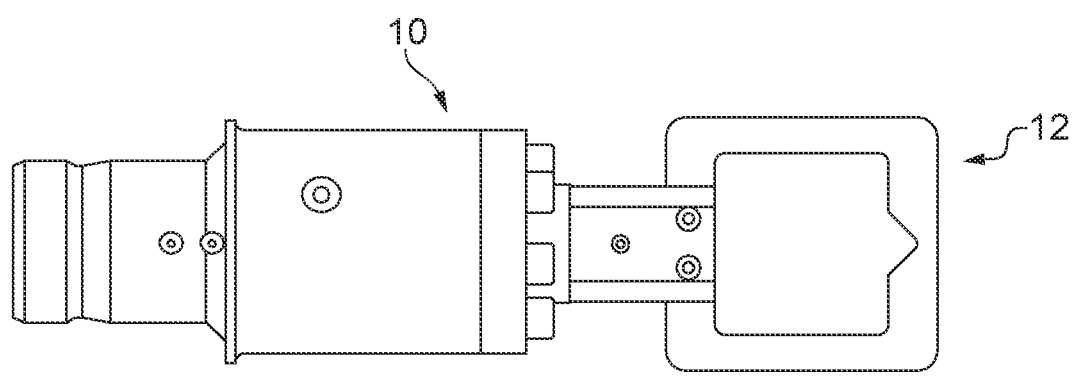

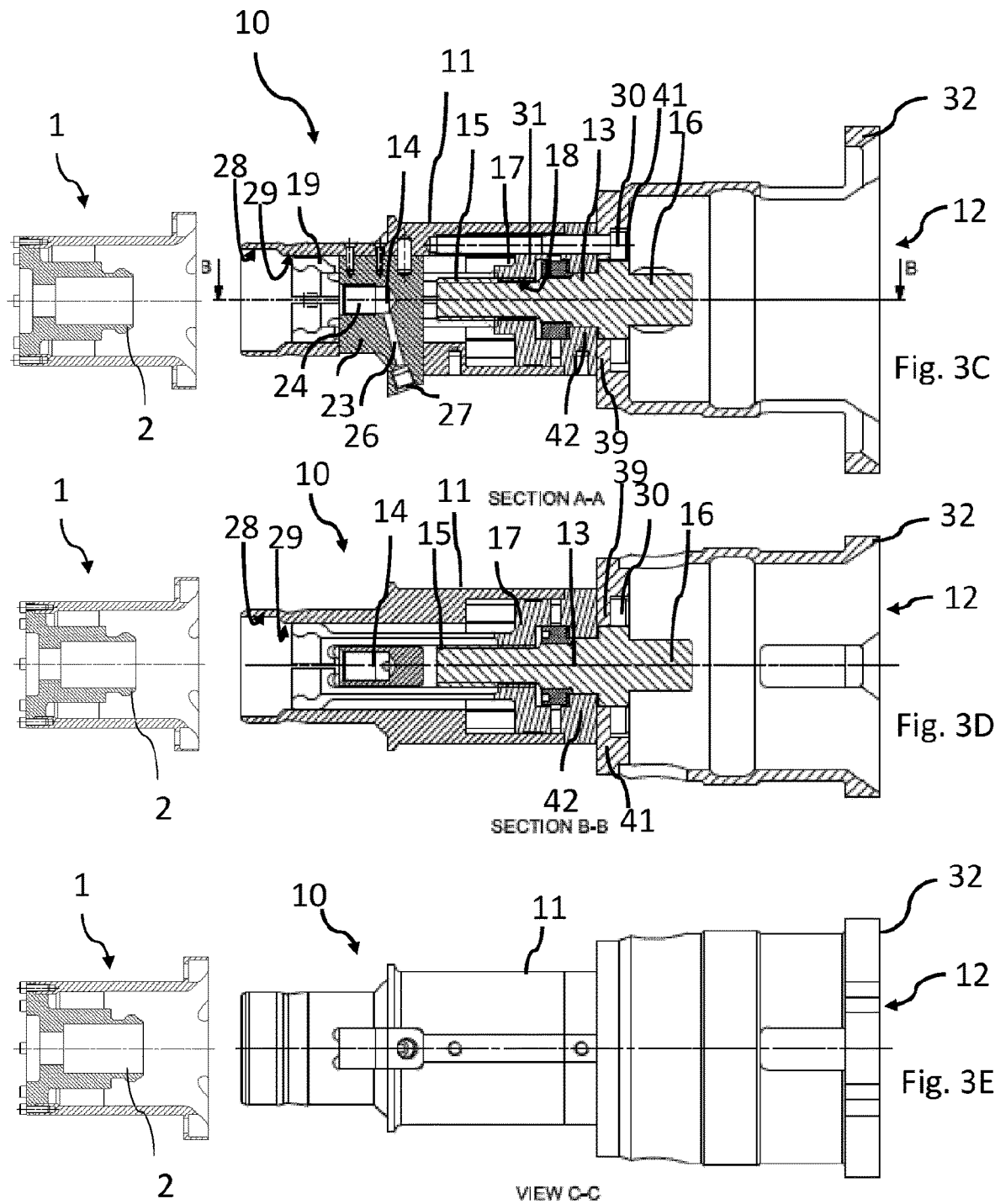

SINGLE LINE QUICK CONNECTOR (SQC), A SYSTEM COMPRISING THE SINGLE LINE QUICK CONNECTOR AND METHOD OF OPERATING

FIELD OF THE INVENTION

The present invention relates to a single line quick connector for connecting a fluid line to a fluid connection interface on a subsea or topside component, a system comprising the single line quick connector as well as a method for connecting the single line quick connector to a connection interface on the component to establish a fluid connection between the component and an external fluid line connected to an external pressurized or non-pressurized connection interface on the component. The connection can be connectable to a subsea component or a topside component, and the connection can be a hydraulic connection or other fluid connection such as water or chemical connection for chemical injection. If used topside, it can also be used in a hydrogen connection.

The invention also relates to a method of overriding a malfunctioning single line quick connector which is in an engaged position locked to the connection interface on the component in order to release the connector from the engaged relationship with the component.

BACKGROUND OF THE INVENTION

Production of hydrocarbons (oil and/or gas) from subsea oil/gas wells typically involves positioning several items of production equipment, such as e.g. Christmas trees, manifolds, pipelines, flowline skids, pipeline end terminations (PLETs), etc. on the sea floor. Flowlines or jumpers are normally coupled to these various items of equipment so as to allow the produced hydrocarbons to flow between and among such production equipment with the ultimate objective being to get the produced hydrocarbon fluids to a desired end-point, e.g., a surface vessel or structure, an on-shore storage facility or pipeline, etc. Jumpers may be used to connect the individual wellheads to a central manifold. In other cases, relatively flexible lines may be employed to connect some on the subsea equipment items to one another.

A stab is a subsea hydraulic connecting device for hydraulic fluid transmission, for instance between a hydraulic power unit localized topside and a subsea component (e.g., a hydraulically operated tool) localized subsea, for instance on the seafloor. Essentially, a stab is a hydraulic quick-acting coupling designed for subsea conditions.

A stab or single line connector connects to a receptacle arranged on the subsea equipment or tool. Usually the connection operation and the corresponding disconnection operation is performed by the use of a Remotely Operated Vehicle (ROV) or a diver. If used topside, a human operator may operate the connection.

Some of the single line connectors (SLC) are operated by rotation in order to connect to the stab to the subsea component. One example of such rotational operation is by specific pre-determined sequences of rotation in the clockwise and counterclockwise direction in order to connect and disconnect the stab from the subsea component.

There are however drawbacks of the described rotationally-operated single line connectors in situations in the event the connector gets stuck or if the pre-determined sequences of rotation are not performed in correct order which may lead to failure or break of the single line connector.

It is therefore a need to address the drawbacks related to the prior art solutions.

One of the objectives of the invention is to provide a single line quick connector which is more easily operable and where the risk of user-errors is minimized.

Another objective is to provide a single line quick connector with a reliable override function in the event the connector gets stuck or other failure/break occurs.

SUMMARY OF INVENTION

The invention is set forth in the independent claims, while the dependent claims describe other characteristics of the invention.

It is described a single line quick connector for connecting a fluid line to a fluid connection interface on a component, wherein the connector comprises:
  an outer housing comprising a tool interface in one axial end thereof for operation by a tool,
  a flow bore for fluid connection with the fluid connection interface on the component,
  a screw element which is rotationally movable and axially fixed relative the outer housing, wherein the screw element extends in a longitudinal direction of the connector and comprises external threads along a part of its axial length and further comprises a termination which is operable by the tool,
  a collet sleeve which is rotationally fixed and axially movable relative the outer housing, wherein the collet sleeve further comprises internal threads for cooperation with the external threads on the screw element, and wherein the collet sleeve comprises a plurality of collet fingers in a first axial end thereof for connection to the fluid connection interface on the component and,
  a fluid line insert comprising a groove for a coupler,
wherein the outer housing, the screw element and the collet sleeve are arranged such that:
  a rotation of the screw element in a first direction results in an axial movement of the outer housing relative the collet sleeve, and thus the collet fingers, in a first axial direction, and
  a rotation of the screw element in a second direction, opposite of the first rotational direction, results in an axial movement of the outer housing relative the collet sleeve, and thus the collet fingers, in a second direction, which is opposite to the first axial direction,
wherein the outer housing comprises a through-going opening and the collet sleeve comprises at least one recess between neighboring collet fingers, wherein the through-going opening and the at least one recess, when connected, are configured to accommodate the fluid line insert, and wherein the fluid line insert is connectable to the fluid line.

The single line quick connector provides a fluid connection between fluid line and fluid connection interface on the component.

The tool can be operable by a remotely operated vehicle (ROV), manually by a diver, or human operated topside.

The termination can be with paddle, square wrench or ROV operable through an API 17H bucket for subsea applications and other tools for topside applications.

In one embodiment the connection can be a hydraulic connection topside or subsea, and the fluid line can be a hydraulic fluid line. The coupler can be a hydraulic coupler for hydraulic fluids.

In another embodiment the connection can be a water connection topside or subsea, and the fluid line can be a water fluid line. The coupler can be a water coupler for water.

In yet another embodiment, the connection can be a chemical fluid connection topside or subsea, and the fluid line can be a chemical fluid line. The coupler can be a chemical coupler for chemical fluids.

If used topside, the single line quick connector can also be used in a hydrogen connection. Similarly, the component can be arranged subsea or topside, and may thus be denoted either subsea component or topside component.

The fluid line insert can also be denoted a fluid line block insert.

The fluid line insert may comprise a through-bore in fluid communication with the flow bore and a connection interface for connection to the fluid line, such that when the fluid line insert is accommodated in the outer housing and the fluid line is connected to the fluid line insert and the coupler is positioned in the flow bore and the fluid line insert, a communication line is formed between the fluid line and the flow bore through the coupler.

The outer housing may comprise:
 an inner axial portion with increased diameter for receiving the collet fingers representing an open position of the connector where the collet fingers are disengaged relative the fluid connection interface on the component, and
 an inner axial portion with reduced diameter for receiving the collet fingers representing an engaged position of the connector where the collet fingers are locked to the fluid connection interface on the component.

In other words, the outer housing may comprise a portion with reduced inner diameter and a portion with increased inner diameter, and wherein the outer housing is movable relative the collet sleeve between a disengaged position of the connector and an engaged position of the connector, wherein:
 in the disengaged position the collet fingers are positioned in a portion of the outer housing with an increased inner diameter, and
 in the engaged position the collet fingers are positioned in a portion of the outer housing with a reduced inner diameter.

In the engaged position, the collet fingers may snap onto/over the fluid connection interface on the component.

As described herein, the setup of the single line quick connector and its engagement and disengagement to the fixed fluid connection interface on the subsea component or topside component, involves that it is the outer housing together with the axially fixed fluid line insert that move relative the fixed fluid connection interface and the collet sleeve. I.e., once the single line quick connector is in correct position relative the fluid connection interface, the collet fingers are at the same axial distance from the fluid connection interface while the radial distance varies depending on whether the collet fingers are engaged with the fluid connection interface or disengaged from the fluid connection interface (depending on whether the collet fingers are located in the inner axial portion with reduced diameter or the inner axial portion with increased diameter of the outer housing).

The at least one recess of the collet sleeve may have a longer axial extension than the fluid line insert when accommodated in the at least one recess such that they can move relative each other during connection and disconnection of the single line quick connector to or from the component.

The fluid line insert may be configured to be axially fixed relative the outer housing and axially movable relative the collet sleeve, such that fluid line insert is allowed to move together with the outer housing along the at least one recess in the axial direction of the single line quick connector.

The collet sleeve may be rotationally locked to the outer housing by axially extending elements or through friction between the outer housing and the collet sleeve.

The collet sleeve may further comprise a connection ring for termination of the collet fingers in an opposite second axial end thereof.

The connection ring may be secured to the outer housing against rotation by axially extending elements. The axially extending elements may be screws or bolts, or other suitable means providing the required function of securing the connection ring to the outer housing. The connection to the outer housing may be via a fastening plate. The fastening plate may form part of the outer housing and may cover the radial cross section of the single line quick connector. The fastening plate may comprise a center opening for receiving the screw element therethrough and peripheral openings for receiving the axially extending elements. A distance plate with a corresponding center opening and peripheral openings as in the fastening plate may be arranged adjacent the fastening plate between the fastening plate and the collet sleeve. A contra nut may be fixedly connected to the distance plate and serves as a lock for the screw element when in an end position such that the screw element can "lift" the single line quick connector when disconnecting/releasing from the component. The axially extending elements may be secured to the outer housing through fastening holes. The collet sleeve, fastening plate and distance plate are preferably rotationally locked to the outer housing by the axially extending elements running through the peripheral openings in the fastening plate and distance plate, respectively, and through peripheral axial bores of the connection ring. However, the outer housing and fastening plate is axially movable relative the collet sleeve and the distance plate which facilitate that a rotation of the screw element results in an axial movement of the outer housing relative the collet sleeve.

The single line quick connector may comprise a hub rotatably locked to the outer housing such that when the hub is rotated the outer housing is rotated. This provides a single line quick connector with a uni-directional connection/engagement to the fluid connection interface on the component. This is an advantage in situations where one needs to account for size and position of pre-installed equipment in that one can orient the single line quick connector during connection to a position where collision and possible damage to equipment is minimized. Furthermore, when connecting/engaging the single line quick connector one may account for the orientation of the fluid line to be connected to the single line quick connector which also reduces risk of complications during connection of the fluid line.

It is further described a fluid line insert for accommodation in a through-going opening in an outer housing of a single line quick connector as described above, the fluid line insert comprising:
 a groove for receiving a hydraulic coupler,
 an external connection interface for connection to an external fluid line,
 a through-bore extending from the groove for the coupler to the external connection interface.

The fluid line insert may comprise a hole for receiving fastening means connecting the fluid line insert to an inner surface of the outer housing radially opposite the through-going opening of the outer housing such that the fluid line insert is axially and rotationally fixed to the outer housing.

It is further described a system comprising a single line quick connector as described above and a fluid line insert as described above.

The system may further comprise a fluid line connected to the external connection interface. The system may further comprise the component with the fluid connection interface.

It is further described a method of engaging a single line quick connector as described above to a fluid connection interface on a component, wherein the method comprises the steps of:
- radially positioning the fluid line insert into the through-going opening of the outer housing and the at least one recess of the collet sleeve,
- positioning a coupler inside the flow bore and the groove of the fluid line insert,
- providing the connector with the collet fingers in a disengaged position,
- moving the connector relative the fluid connection interface into a position where the collet fingers snap onto or over the fluid connection interface,
- rotating the screw element in a first direction resulting in an axial movement of the outer housing relative the collet sleeve, and thus the collet fingers, to an engaged position where the collet fingers lock around the fluid connection interface,
- connecting a fluid line to the fluid line insert.

Additionally, one may, prior to rotating the screw element, rotate the connection interface for correct orientation of the fluid line relative the single line quick connector and other lines, pipes, components that may be present in proximity of where the connection is to be made.

Disengagement of the single line quick connector from the fluid connection interface may comprise the steps of:
- rotating the screw element in a second direction, opposite of the first rotational direction, resulting in an axial movement of the outer housing relative the collet sleeve, and thus the collet fingers, to a disengaged position where the collet fingers unlock from the fluid connection interface.

It is further described a method of overriding a malfunctioning single line quick connector as described above, which connector is in an engaged position locked to the fluid connection interface on the component, wherein the method comprises the steps of:
- providing a milling tool on a tool,
- utilizing said milling tool to mill an annular groove around the screw element at least over a distance equal to a travel distance of the collet sleeve thereby loosening the axially fixed relationship of the screw element relative the outer housing,
- utilizing a pushing tool to axially move the outer housing relative the screw element and the collet sleeve to the disengaged position.

The step of milling an annular groove may comprise milling through the fastening plate and any distance plate. The axial milling distance being at least equal to a travel distance of the collet sleeve. The milling resulting in loosening the axially fixed relationship of the screw element relative the outer housing (via the fastening plate).

Summarized, the invention described herein may have at least some of the following main benefits or advantages:
- Reduced risk of user-errors by being easy to operate in that the threads are preferably in "standard", i.e. "clockwise rotation" (rotation to the right) connects the single line quick connector to the component while "counter-clockwise rotation" disconnects the connector from the component.
- Uni-directional connection to the fluid connection interface on the component.
- Less risk of issues due to calcareous deposits.
- A reliable override functionality in case the single line quick connector gets stuck (overgrown, threads get worn etc.) and cannot be removed using standard disconnecting procedure.
- Standard interface towards ROV. No need to tailor ROV for operating the single line quick connector.
- Standard interface towards already installed subsea component(s). No need to tailor interface on already installed subsea component or equipment.
- No welding compared to prior art solutions.

These and other embodiments of the present invention will be apparent from the attached drawings, where:

BRIEF DESCRIPTION OF THE DRAWINGS

FIGS. 2A-2D show different views of an exemplary single line quick connector according to the present invention with a hydraulic fluid line connected thereto;

FIGS. 3A-3E are different cross-sectional views of a single line quick connector according to the invention, where FIG. 3A is top view along an axis extending through the single line quick connector seen from the ROV connection end of the connector, FIG. 3B is a side view of the single line quick connector, FIG. 3C is a view along section A-A in FIG. 3A, FIG. 3D is a view along section B-B in FIG. 3C and FIG. 3E is a view along section C-C in FIG. 3B;

DETAILED DESCRIPTION OF A PREFERENTIAL FORM OF EMBODIMENT

Figure 1A:
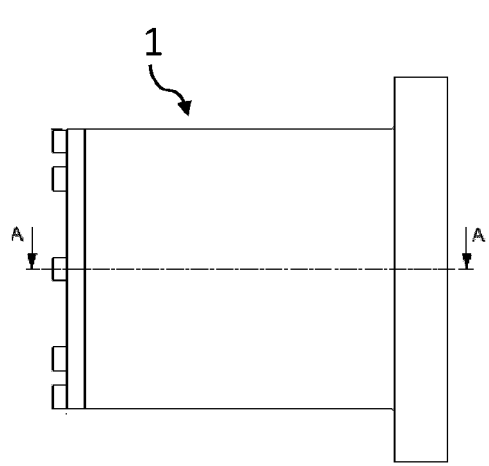
FIGS. 1A-1E show different views and cross-sections of an example of a subsea component which is attached to a fixed structure with a fluid connection interface on to which a single line quick connector according to the present invention can be connected.

In the following, embodiments of the invention will be discussed in more detail with reference to the appended drawings. It should be understood, however, that the drawings are not intended to limit the invention to the subject-matter depicted in the drawings. Furthermore, even though some of the features are described in relation to the single line quick connector only, it is apparent that they are valid for the related method as well, and vice versa. Hence, any features described in relation to the method are also valid for the single line quick connector 10.

Furthermore, the single line quick connector 10 will now be described in relation to connection to a subsea component 1 using ROV 3, however, instead of ROV 3, a diver 45 may operate the single line quick connector 10 at shallower depths. In addition, although not explicitly disclosed in the following Figures, the single line quick connector 10 may be used topside where it is operated by a human operator, such topside use of the single line quick connector will be apparent for the skilled person when reading the following disclosure.

Figure 1B:
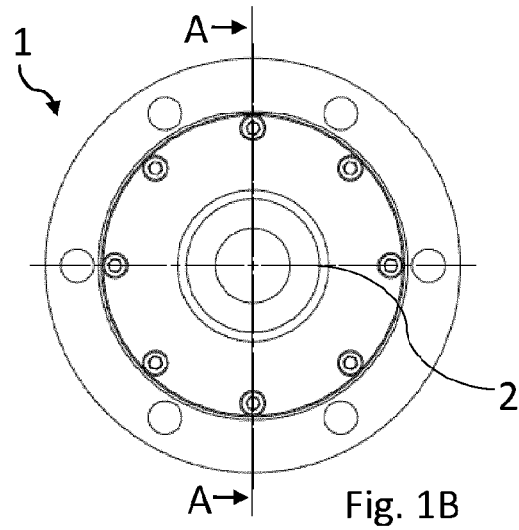
Figure 1C:
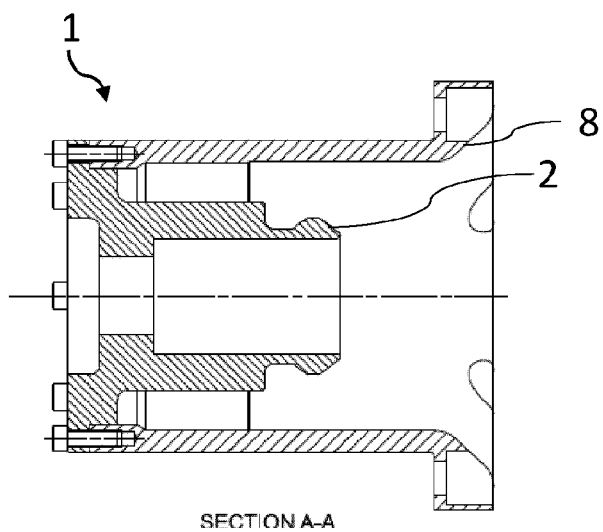
Figure 1D:
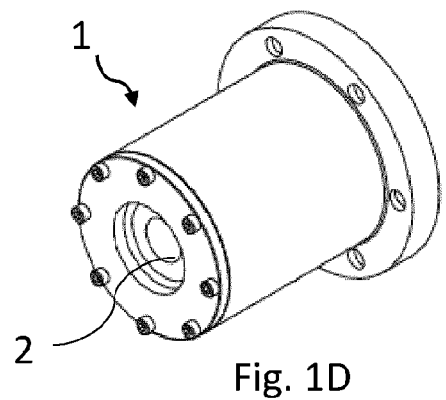
Figure 1E:
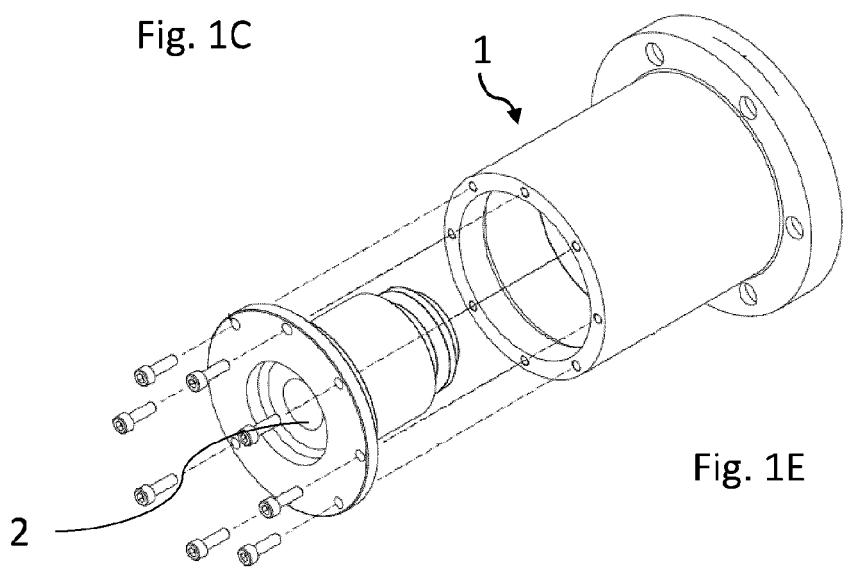

FIGS. 1A-1E show different views and cross-sections of an example of a subsea component with a fluid connection interface 2 on to which a single line quick connector according to the present invention can be connected. In particular, FIG. 1A is a side view, FIG. 1B is a top view along a centre axis of the fluid connection interface 2, FIG. 1. C is a cross section view along section A-A of FIG. 1A, FIG. 1D is a perspective side view, while FIG. 1E is an exploded view of FIG. 1D. The fluid connection interface 2 on the subsea component 1 has a circular cross-section with varying outer diameter along its center axis, i.e. it has a portion with relatively larger outer diameter in a distal end followed by a portion with a relatively smaller diameter such that the single line quick connector according to the invention can snap onto/over the fluid connection interface 2 on the subsea component 1. The subsea component 1 is disclosed with a guide portion 8 for aligning the single line quick connector in line with, and onto, the fluid connection interface 2.

Figure 1F:
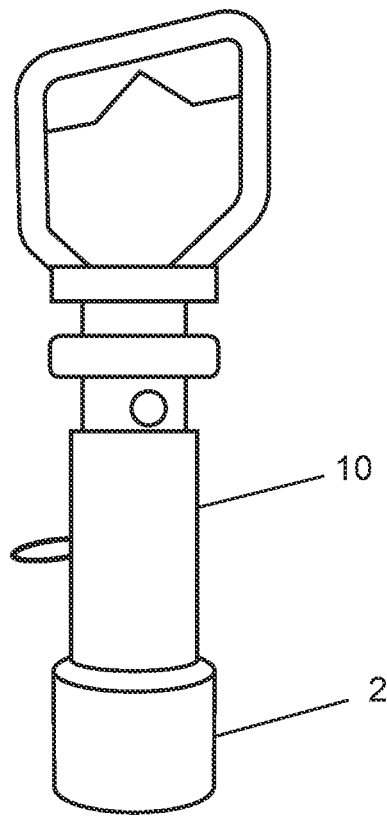
FIG. 1F shows an example of a single line quick connector with a J-slot for connection to the connection interface of FIGS. 1A-1E.

FIG. 1F shows an example of a single line quick connector 10 with a J-slot for connection to the connection interface of FIGS. 1A-1E. The single line quick connector 10 is the outboard part and is shown to include an ROV paddle interface/handle, which does not have an override function in case of user-error or jamming. The single line quick connector 10 is shown engaged with an example of an inboard connector on a subsea component 1.

Figure 1G:
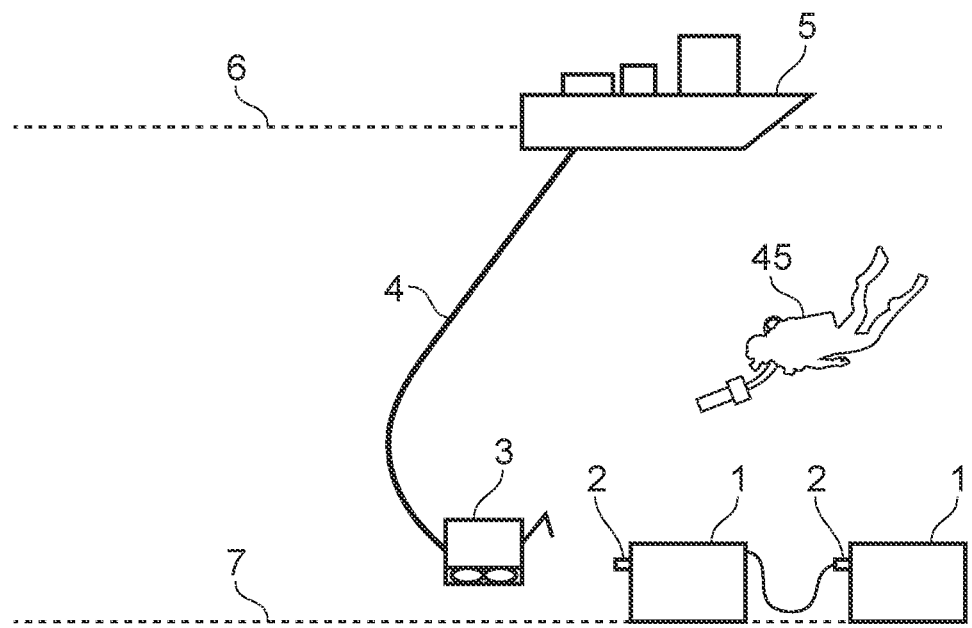
FIG. 1G shows setup with a vessel floating on surface of water with a Remotely Operated Vehicle (ROV) connected to the vessel for establishing a hydraulic connection between the vessel and the subsea component arranged at seabed via the fluid connection interface on the subsea component.

FIG. 1G shows setup with a vessel 5 floating on surface of water 6 with a Remotely Operated Vehicle (ROV) 3 connected to the vessel 5 for establishing a hydraulic connection between the vessel 5 and the subsea component 1 arranged at seabed 7 via the fluid connection interface 2 on the subsea component 1 or internal connection between two subsea components 1. Alternatively, instead of an ROV 3, a diver 45 can perform the connection (on relatively shallower depths). However, although not shown, and as indicated above, the single line quick connector can be connected to a component 1 arranged topside and a human operator may perform the connection in "dry" environment, i.e. in air instead of subsea.

FIGS. 2A-2D show different views of an exemplary single line quick connector according to the present invention with a hydraulic fluid line 20 connected to a radial connection interface 27 for the hydraulic fluid line 20 on the single line quick connector 10. The single line quick connector comprises a ROV interface 12 for operation by a ROV (ROV not shown in FIGS. 2A-2D, see FIG. 1G). In FIG. 2B, which is a view along a centre axis of the single line quick connector 10, collet fingers 19 on the single line quick connector 10 for engagement with the fluid connection interface 2 on the subsea component 1 is shown.

Figure 3A:
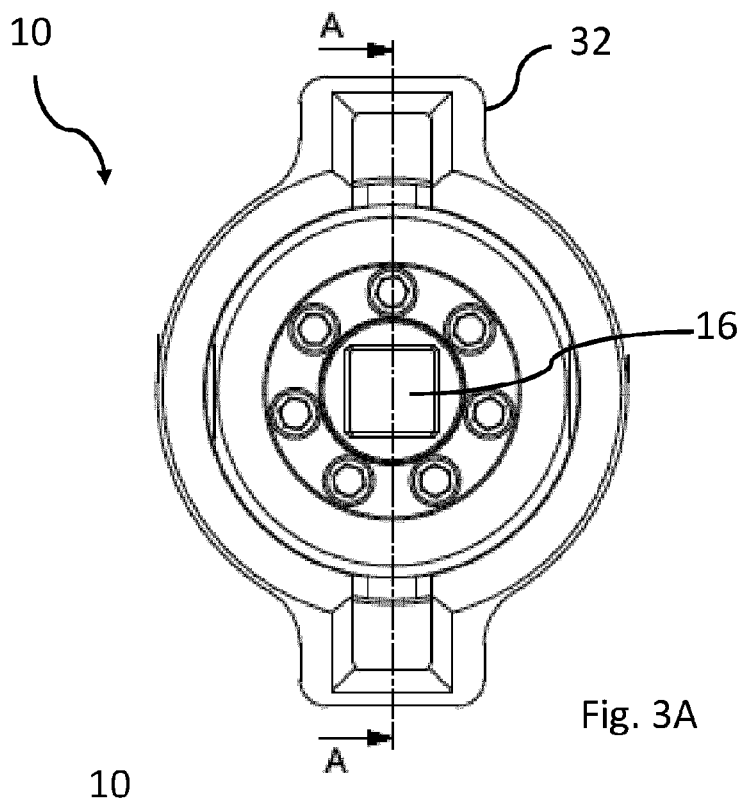
Figure 3B:
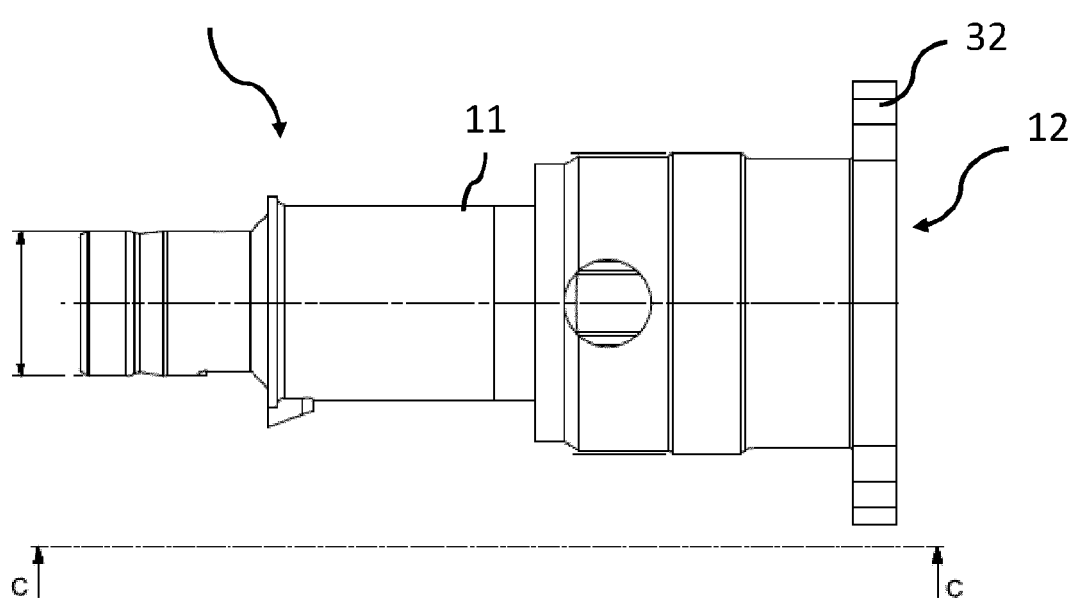

FIGS. 3A-3E are different cross sectional views of a single line quick connector 10 according to the invention, where FIG. 3A is a view along an axis extending through the single line quick connector 10 seen from the ROV connection end of the connector 10, FIG. 3B is a side view of the single line quick connector 10, FIG. 3C is a view along section A-A in FIG. 3A, FIG. 3D is a view along section B-B in FIG. 3C and FIG. 3E is a view along section C-C in FIG. 3B. In FIG. 3A, the termination 16 of the screw element is shown. This termination 16 is shown as a screw head or knob and is rotatably operated by an ROV (ROV not shown in FIG. 3A, see FIG. 1G) via e.g. API 17H bucket interface or paddle interface/handle (see e.g. FIG. 1F). The single line quick connector 10 comprises an outer housing 11 with a ROV connectable hub 32 in the form of an API 17H bucket in the distal end facing away from the end of the single line quick connector 10 which is engageable to the fluid connection interface 2 on the subsea component 1.

Now referring to FIGS. 3C and 3D, and 4A and 4B, details of the operational relationship of the components of the single line quick connector 10 will be described.

The single line quick connector 10 comprises an outer housing 11 comprising an ROV interface 12 in one axial end thereof for operation by a Remotely Operated Vehicle (ROV) 3. The opposite axial end of the single line quick connector 10 is for connection to the fluid connection interface 2 on the subsea component 1.

Starting from the axial end at the position of the ROV interface 12, the single line quick connector 10 comprises a screw element 13 which is rotationally movable and axially fixed relative the outer housing 11. The screw element 13 extends in a longitudinal direction of the connector 10 and comprises external threads 15 along a part of its axial length and a termination 16 which is operable by an ROV 3. The screw element 13 is arranged in a fastening plate 39. The fastening plate 39 is rotationally connected to the outer housing 11 and covers the radial cross section of the single line quick connector 10. The fastening plate 39 comprises a center opening 40 for receiving the screw element 13 therethrough and peripheral openings 41 for receiving axially extending elements 30. A distance plate 42 with a corresponding center opening 40 and peripheral openings 41 may be arranged adjacent the fastening plate 39 between the fastening plate 39 and a collet sleeve 17. A contra nut 9 may be fixedly connected to the distance plate 42 and serves as a lock for the screw element 13 when in an end position such that the screw element 13 can "lift" the single line quick connector when disconnecting/releasing from the component 1. The collet sleeve 17 is rotationally fixed and axially movable relative the outer housing 11, and comprises a connection ring 31 for termination of a number of collet fingers 19. The connection ring 31 comprises a center screw element bore 38 and peripheral axial bores 37 aligned with the center openings 40 and peripheral openings 41 of the fastening plate 39 and distance plate 42, respectively. The screw element bore 38 of the collet sleeve 17 comprises internal threads 18 for cooperation with the external threads 15 on the screw element 13. The collet sleeve 17 further comprises a plurality of collet fingers 19 connected at one axial end thereof to the connection ring 31, the opposite axial end thereof being radially flexible for snap-lock connection to the fluid connection interface 2 on the subsea component 1. The outer housing 110 comprises an inner axial portion with increased diameter 28 for receiving the collet fingers 19 representing an open position of the connector 2 where the collet fingers 19 are disengaged or released relative the fluid connection interface 2 on the subsea component 1, and an inner axial portion with reduced diameter 29 for receiving the collet fingers 19 representing an engaged, locked or connected position of the connector 10 where the collet fingers 19 are locked to the fluid connection interface 2 on the subsea component 1.

Figure 4A:
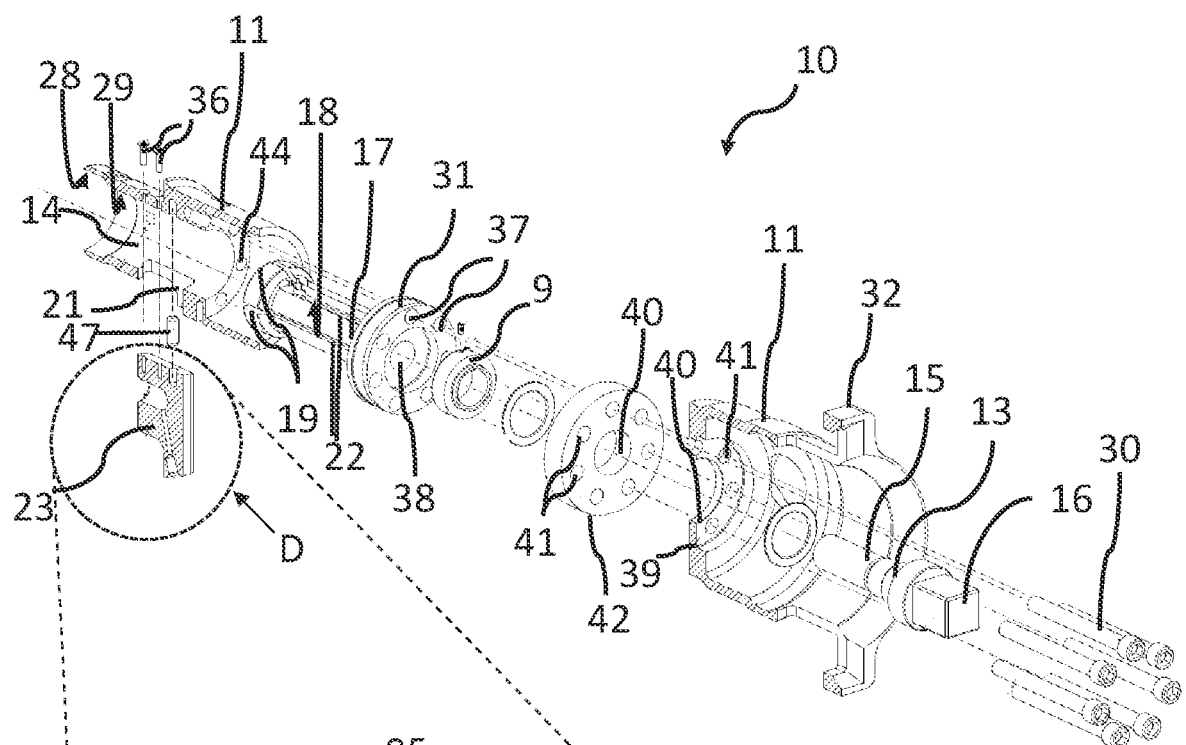
FIG. 4A is an exploded view of a single line quick connector according to the invention.

The collet sleeve 17, fastening plate 39 (and ROV connectable hub 32) and distance plate 42 are rotationally locked to the outer housing 11 by axially extending elements 30 running through the peripheral openings 41 in the fastening plate 39 and distance plate 42, respectively, and through the peripheral axial bores 37 of the connection ring 31. The ROV connectable hub 32 is secured to the outer housing 11 by the axially extending elements 30 which run through the ROV connectable hub 32 and into axially extending threaded fastening holes 44 (see. FIG. 4A) in the outer housing 11. However, the outer housing 11 and the fastening plate 39 are axially movable relative the collet sleeve 17 and the distance plate 42, which facilitates that a rotation of the screw element 13 results in an axial movement of the outer housing 11 relative the collet sleeve 17. The setup of the single line quick connector 10 and its engagement and disengagement to the fixed fluid connection interface 2 on the subsea component 1, involves that it is actually the outer housing 11 together with the axially fixed fluid line insert 23 that move relative the fixed fluid connection interface 2 and the collet sleeve 17. I.e., once the single line quick connector 10 is in the correct position relative the fluid connection interface 2, the collet fingers 19 are at the same axial distance from the fluid connection interface 2 while the radial distance varies depending on whether the collet fingers 19 are engaged with the fluid connection interface 2 or disengaged from the fluid connection interface 2 (depending on whether the collet fingers 19 are located in the inner axial portion 29 with reduced diameter or the inner axial portion 28 with increased diameter of the outer housing 11).

The outer housing 11 further comprises a through-going opening 21 and the collet sleeve 17 comprises at least one recess 22 between neighboring collet fingers 19. The through-going opening 21 and the at least one recess 22 are arranged such that, when connected, they are configured to accommodate a fluid line insert 23. The at least one recess 22 has a longer axial extension than the fluid line insert 23 when the fluid line insert 23 is accommodated in the at least one recess 22 which enables the possibility of axial relative movement of the fluid line insert 23 along the at least one recess 22.

Figure 6A:
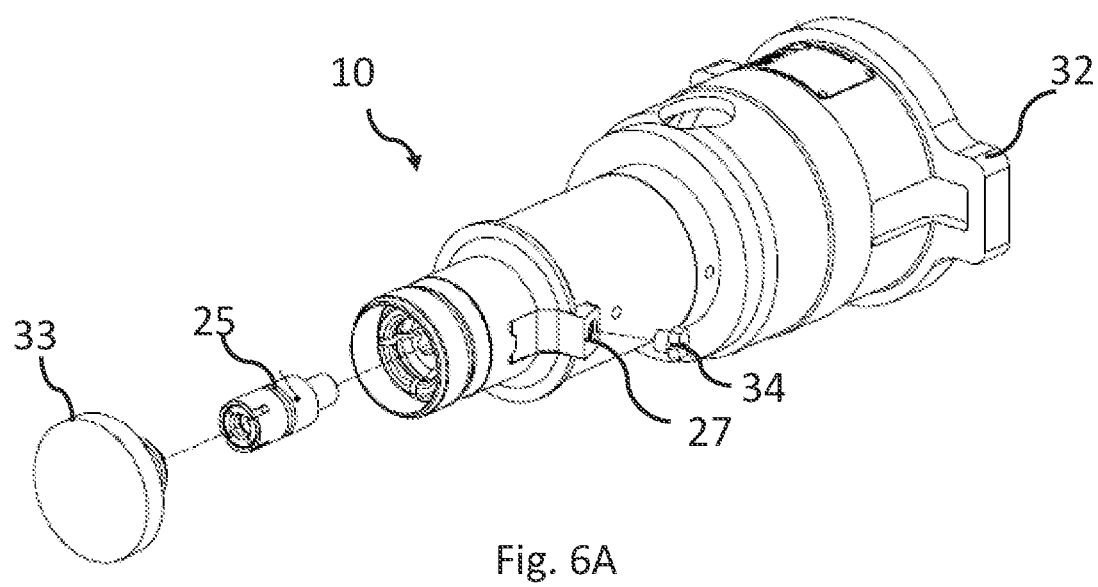
FIGS. 6A and 6B show details of a hydraulic coupler and a protective cap of a single line quick connector according to the invention in two different side views.
Figure 6B:
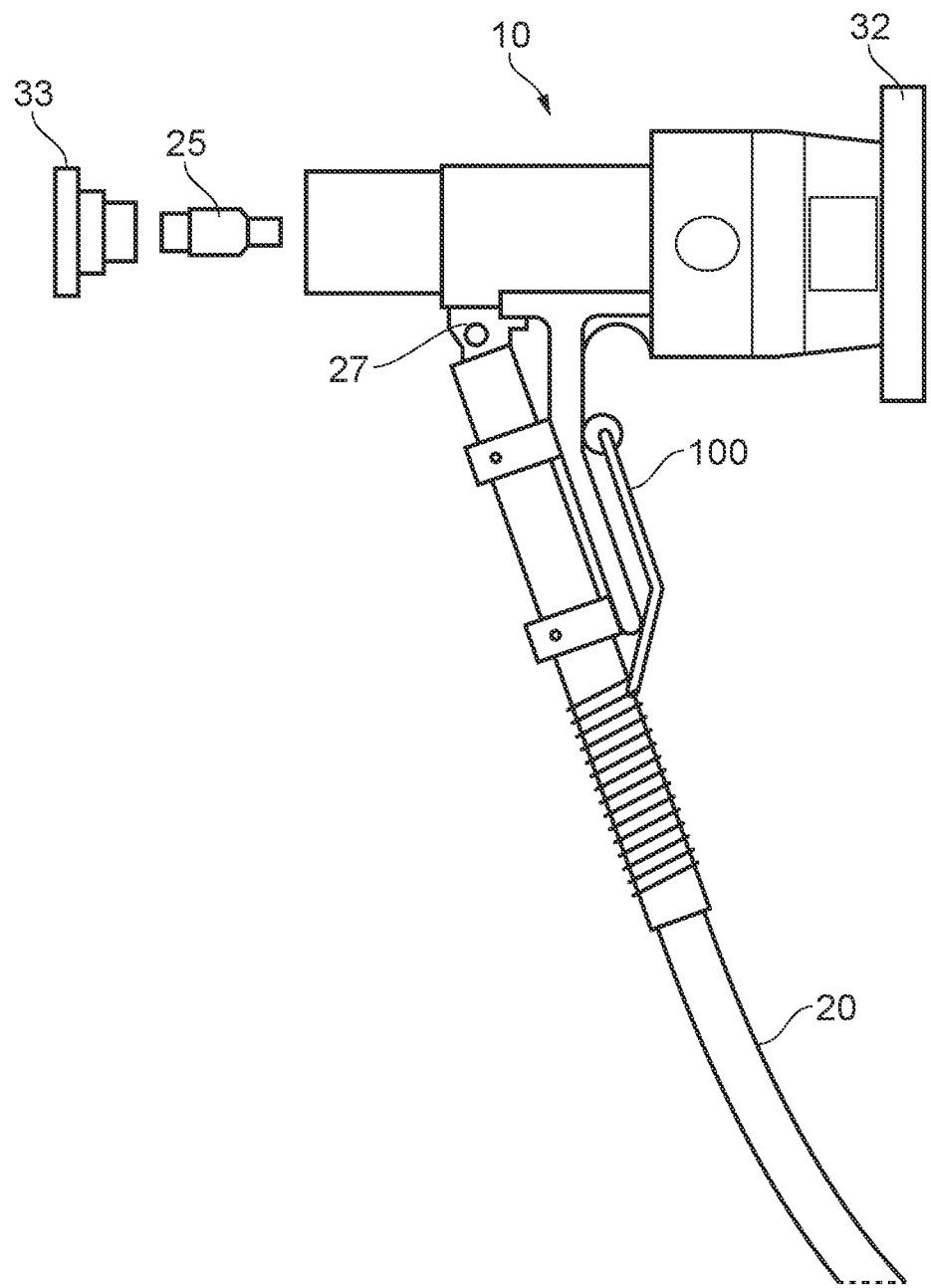

The fluid line insert 23 is connectable to the hydraulic fluid line 20 and comprises a groove 24 for a hydraulic coupler 25 (coupler 25 not shown, see FIGS. 6A and 6B). The fluid line insert 23 is preferably securely fastened to the outer housing 11 by fastening means 36 through holes 35 such that the fluid line insert 23 is axially and rotationally fixed to the outer housing 11. A guide pin 47 assists in guiding the fluid line insert 23 correctly relative the outer housing 11.

The outer housing 11, the screw element 13 and the collet sleeve 17 are arranged such that: a rotation of the screw element 13 in a first direction results in an axial movement of the outer housing 11 relative the collet sleeve 17, and thus the collet fingers 19, in a first axial direction, and a rotation of the screw element 13 in a second direction, opposite of the first rotational direction, results in an axial movement of the outer housing 11 relative the collet sleeve 17, and thus the collet fingers 19, in a second direction, which is opposite to the first axial direction.

A flow bore 14 provides fluid connection through the hydraulic coupler 25 with the fluid connection interface 2 on the subsea component 1 when the single line quick connector 10 is connected to the fluid connection interface 2.

Figure 4B:
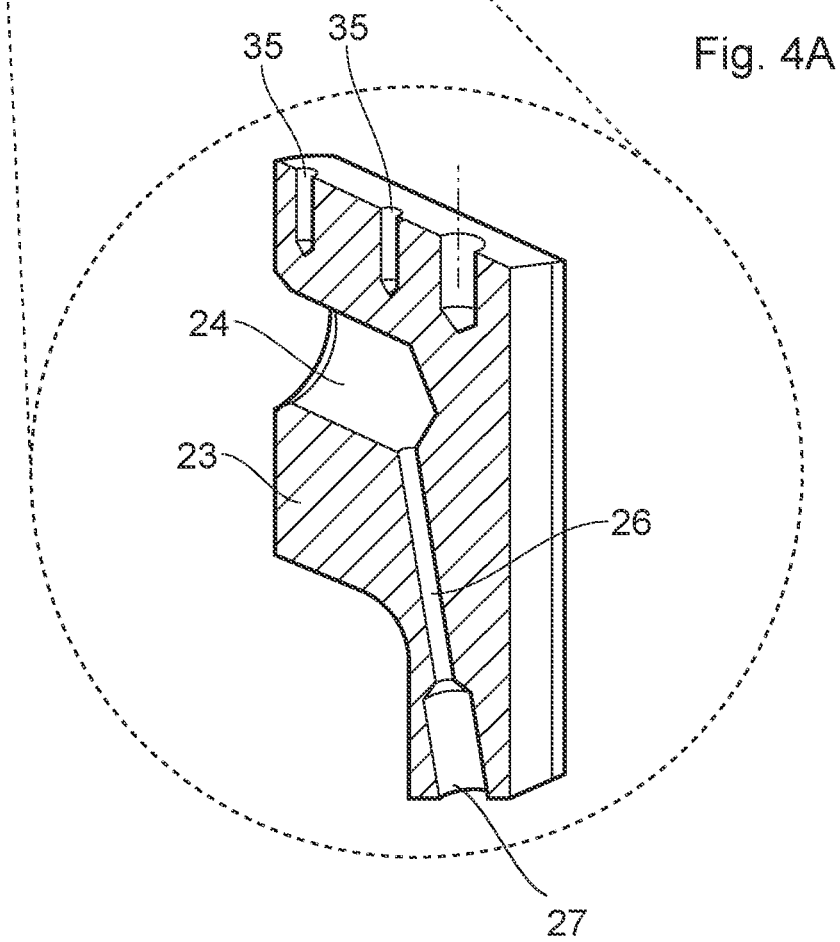
FIG. 4B is an enlarged view of the fluid line block insert in detail D in FIG. 4A.

FIG. 4A is an exploded view of a single line quick connector according to the invention, and FIG. 4B is an enlarged view of the fluid line insert in detail D in FIG. 4A. Referring to FIGS. 4A and 4B, the fluid line insert 23 comprises a through-bore 26 in fluid communication with the flow bore 14 and a connection interface 27 for connection to the hydraulic fluid line 20 (see e.g. FIGS. 2A, 2B, 2C, 6B), such that when the fluid line insert 23 is accommodated in the through-going opening 21 in the sidewall of the outer housing 11 and the hydraulic fluid line 20 is connected to the fluid line insert 23 and the hydraulic coupler 25 is positioned in the flow bore 14 and the fluid line insert 23, a hydraulic communication line is formed between the hydraulic fluid line 20 and the flow bore 14 through the hydraulic coupler 25.

The size and shape of the fluid line insert 23 and the through-going opening 21 in the outer housing 11 are complementary such that a tight fit preventing leaks is formed between the them when the fluid line insert 23 is accommodated in the through-going opening 21. This gives a tight and stable positioning of the coupler 25 such that the coupler is fluid tight while at the same time is compensated for relative water depth (if used subsea).

Figure 5:
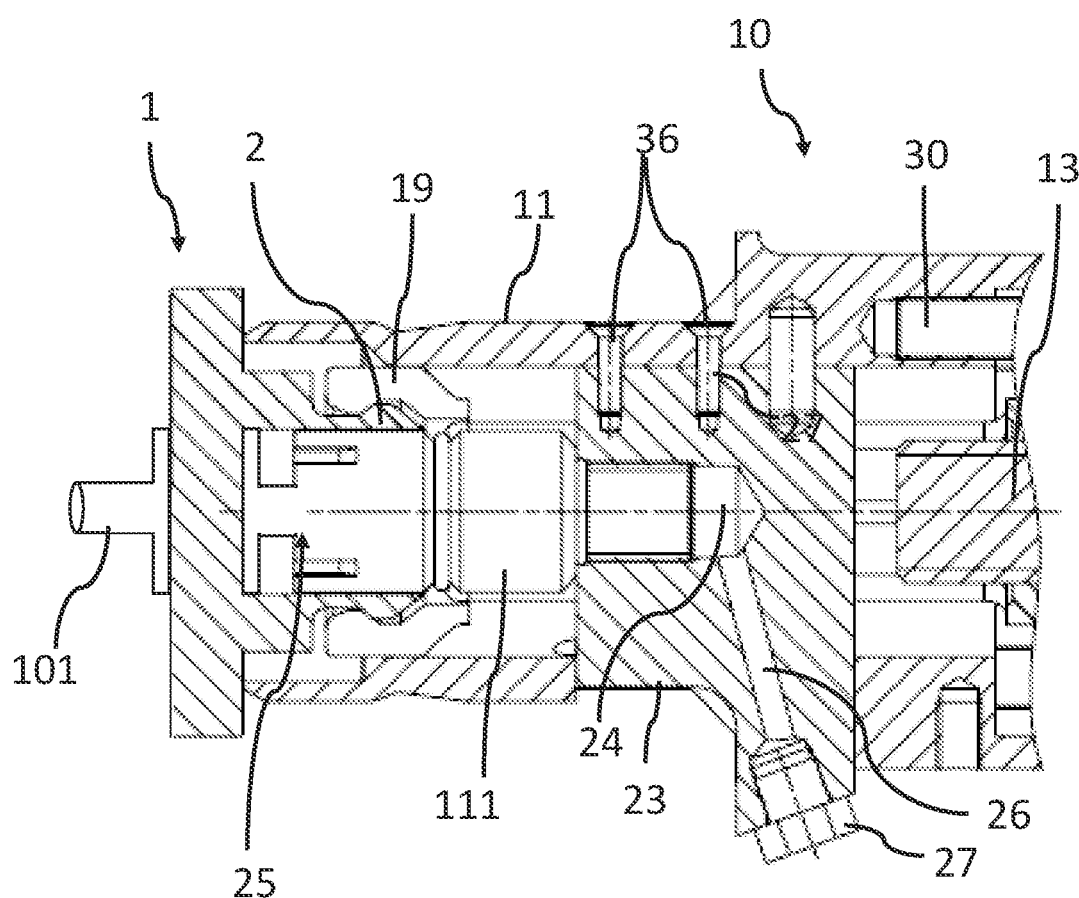
FIG. 5 shows the collet fingers of the single line quick connector engaged with a fluid connection interface of a subsea component.

FIG. 5 shows the collet fingers 19 of the single line quick connector 10 engaged with a fluid connection interface 2 on a subsea component 1. The coupler 25 has a male interface 101 for connection to the component 1 and a female interface 111 in an opposite axial end of the male interface 101.

In operation, with reference to FIGS. 3C, 3D, 4A, 4B and 5, engaging the single line quick connector 10 to a fluid connection interface 2 on a subsea component 1 may comprise the steps of:
  radially positioning the fluid line insert 23 into the through-going opening 21 of the outer housing 11 and the at least one recess 22 of the collet sleeve 17,
  positioning a hydraulic coupler 25 inside the flow bore 14 and the groove 24 of the fluid line insert 23,
  providing the connector 10 with the collet fingers 19 in a disengaged position in an inner axial portion 28 with increased diameter,
  moving the connector 10 relative the fluid connection interface 2 into a position where the collet fingers 19 snap onto the fluid connection interface 2 on the subsea component 1,
  rotating the screw element 13 in a first direction resulting in an axial movement of the outer housing 11 relative the collet sleeve 17, and thus the collet fingers 19, to an engaged position (i.e. inner axial portion 29 with reduced diameter) where the collet fingers 19 lock around the fluid connection interface 2,
  connecting a hydraulic fluid line 20 to the fluid line insert 23.

The steps of disengaging the connector 10 from the fluid connection interface 2 may comprise the steps of:
  rotating the screw element 13 in a second direction, opposite of the first rotational direction, resulting in an axial movement of the outer housing 11 relative the collet sleeve 17, and thus the collet fingers 19, to a disengaged position where the collet fingers 19 unlock from the fluid connection interface 2.

The single line quick connector further comprises an override function in the event the single line quick connector 10 malfunctions (i.e. gets stuck or broken) when it is in the engaged position and locked onto the fluid connection interface 2 on the subsea component 1. Overriding the single line quick connector 10 may comprise the steps of:

providing a milling tool on a Remotely Operated vehicle (ROV) 3, utilizing said milling tool to mill an annular groove around the screw element 13 through the fastening plate 39 and any distance plate 42. The axial milling distance being at least equal to a travel distance of the collet sleeve 17. The milling resulting in loosening the axially fixed relationship of the screw element 13 relative the outer housing 11 (via the fastening plate 39), utilizing a pushing tool of the ROV 3 to axially move the outer housing 11 relative the screw element 13 and the collet sleeve 17 to the disengaged position.

FIGS. 6A and 6B show details of a hydraulic coupler 25 and a dust cap 33 of a single line quick connector 10 according to the invention in two different side views. The dust cap 33 protects the components of the single line quick connector 10 which engages the fluid connection interface 2 on subsea component 1, such as the distal end of the outer housing 11 and the collet fingers 19. The hydraulic coupler 25 serves to provide fluid connection between the fluid connection interface 2 on subsea component 1 and the hydraulic fluid line 20 connected to the single line quick connector 10 via the connection interface 27. A blind plug 34 may be provided to protect the connection interface 34 when the single line quick connector 10 is used as a protection/pressure cap for the hydraulic fluid line 20.

Referring to FIG. 6B, the hydraulic fluid line 20 is disclosed connected to the connection interface 27 and typically extends to a surface location or to next X-mas tree, to manifold, subsea distribution unit etc. A tension reliever 100 may be connected to the single line quick connector for supporting the hydraulic fluid line 20. This may be an advantage in situations where the hydraulic fluid line 20 is oriented in an abnormal angle or direction relative the connection interface for the hydraulic fluid line 27.

The invention is now explained with reference to non-limiting embodiments. However, a skilled person will understand that there may be made alterations and modifications to the embodiment that are within the scope of the invention as defined in the attached claims.

List of references:

| | |
|---|---|
| 1 | Component/Subsea component |
| 2 | Fluid connection interface on subsea component |
| 3 | Tool/Remotely Operated Vehicle (ROV) |
| 4 | Power and communication line for ROV |
| 5 | Vessel |
| 6 | Surface of water |
| 7 | Seabed |
| 8 | Guide portion |
| 9 | Contra nut |
| 10 | Single line quick connector |
| 11 | Outer housing |
| 12 | ROV interface |
| 13 | Screw element |
| 14 | Flow bore |
| 15 | External threads on screw element |
| 16 | Termination of screw element |
| 17 | Collet sleeve |
| 18 | Internal threads |
| 19 | Collet fingers |
| 20 | Fluid line/Hydraulic fluid line |
| 21 | Through-going opening of housing |
| 22 | Recess |
| 23 | Fluid line insert/fluid line block insert |
| 24 | Groove for receiving hydraulic coupler |
| 25 | Coupler/Hydraulic coupler |
| 26 | Through-bore of fluid line insert |
| 27 | Connection interface for hydraulic fluid line |
| 28 | Inner axial portion with increased diameter |
| 29 | Inner axial portion with reduced diameter |
| 30 | Axially extending elements |
| 31 | Connection ring |
| 32 | ROV connectable hub |
| 33 | Dust Cap |
| 34 | blind plug |
| 35 | Hole for receiving fastening means |
| 36 | Fastening means for securing fluid line insert |
| 37 | Bore |
| 38 | Screw element bore |
| 39 | Fastening plate |
| 40 | Center opening |
| 41 | Peripheral opening |
| 42 | Distance plate |
| 44 | Fastening holes |
| 45 | Diver |
| 47 | Guide pin |
| 100 | Tension reliever |
| 101 | coupler male interface |
| 111 | coupler female interface |

The invention claimed is:

1. A single line quick connector for connecting a fluid line to a fluid connection interface on a component, the single line quick connector comprising:

an outer housing comprising a tool interface at one axial end thereof for operation by a tool;

a flow bore for fluid connection with the fluid connection interface on the component;

a screw element which is rotationally movable and axially fixed relative the outer housing, wherein the screw element extends in a longitudinal direction of the connector and comprises external threads along a part of its axial length and a termination which is operable by the tool;

a collet sleeve which is rotationally fixed and axially movable relative the outer housing, wherein the collet sleeve comprises internal threads for cooperation with the external threads on the screw element and a plurality of collet fingers at a first axial end of the collet sleeve for connection to the fluid connection interface on the component; and a fluid line insert comprising a groove for a coupler;

wherein the outer housing, the screw element and the collet sleeve are arranged such that:

a rotation of the screw element in a first direction results in an axial movement of the outer housing relative the collet sleeve, and thus the collet fingers, in a first axial direction; and a rotation of the screw element in a second direction, opposite of the first rotational direction, results in an axial movement of the outer housing relative the collet sleeve, and thus the collet fingers, in a second direction, which is opposite to the first axial direction;

wherein the outer housing comprises a radial through-going opening and the collet sleeve comprises at least one recess between neighboring collet fingers, wherein the through-going opening and the at least one recess are configured such that, when connected, the fluid line insert extends radially through the through-going opening and the at least one recess, and wherein the fluid line insert is connectable to the fluid line.

2. The single line quick connector according to claim 1, wherein the fluid line insert comprises a through-bore in fluid communication with the flow bore and a connection interface for connection to the fluid line, such that when the fluid line insert is accommodated in the outer housing and the fluid line is connected to the fluid line insert and the coupler is positioned in the flow bore and the fluid line insert, a communication line is formed between the fluid line and the flow bore through the coupler.

3. The single line quick connector according to claim 1, wherein the outer housing comprises:
an inner axial portion with an increased diameter for receiving the collet fingers in an open position of the connector in which the collet fingers are disengaged from the fluid connection interface on the component; and
an inner axial portion with a reduced diameter for receiving the collet fingers in an engaged position of the connector in which the collet fingers are locked to the fluid connection interface on the component.

4. The single line quick connector according to claim 1, wherein the at least one recess of the collet sleeve has a longer axial length than an axial length of the fluid line insert when the fluid line insert is accommodated in the at least one recess.

5. The single line quick connector according to claim 4, wherein the fluid line insert is configured to be axially fixed relative the outer housing and axially movable relative the collet sleeve, such that the fluid line insert is allowed to move together with the outer housing along the at least one recess in the axial direction.

6. The single line quick connector according to claim 1, wherein the collet sleeve is rotationally locked to the outer housing by a number of axially extending elements.

7. The single line quick connector according to claim 1, wherein the collet sleeve further comprises a connection ring for termination of the collet fingers at an opposite second axial end of the collet sleeve.

8. The single line quick connector according to claim 7, wherein the connection ring is secured against rotation to the outer housing by a number of axially extending elements.

9. The single line quick connector according to claim 1, wherein the connector comprises a hub rotatably locked to the outer housing such that when the hub is rotated the outer housing is rotated.

10. A single line quick connector comprising:
an outer housing having a tool interface at one axial end thereof for operation by a tool;
a flow bore for fluid connection with a fluid connection interface on a component;
a screw element rotationally movable and axially fixed relative the outer housing, the screw element extending in a longitudinal direction of the connector and comprising external threads along a part of its axial length and a termination operable by the tool; and
a collet sleeve rotationally fixed and axially movable relative the outer housing, the collet sleeve comprising internal threads for cooperation with the external threads on the screw element and a plurality of collet fingers for connection to the fluid connection interface;
wherein the outer housing, the screw element and the collet sleeve are arranged such that a rotation of the screw element in a first direction results in an axial movement of the outer housing relative the collet sleeve, and thus the collet fingers, in a first axial direction, and a rotation of the screw element in a second direction opposite the first rotational direction results in an axial movement of the outer housing relative the collet sleeve, and thus the collet fingers, in a second direction opposite the first axial direction;
wherein the single line quick connector further comprises a fluid line insert for accommodation in a through-going opening in the outer housing of the single line quick connector, the fluid line insert comprising:
a hole for receiving fastening means for connecting the fluid line insert to an inner surface of the outer housing radially opposite the through-going opening of the outer housing such that the fluid line insert is axially and rotationally fixed to the outer housing;
a groove for receiving a coupler;
an external connection interface for connection to an external fluid line; and
a through-bore extending from the groove to the connection interface;
wherein the collet sleeve comprises at least one recess between neighboring collet fingers, and wherein the through-going opening and the at least one recess are configured such that, when connected, the fluid line insert extends radially through the through-going opening and the at least one recess.

11. A method of engaging a single line quick connector to a fluid connection interface on a component, the single line quick connector comprising:
an outer housing comprising a tool interface at one axial end thereof for operation by a tool;
a flow bore for fluid connection with the fluid connection interface;
a screw element rotationally movable and axially fixed relative the outer housing, the screw element extending in a longitudinal direction of the connector and comprising external threads along a part of its axial length and a termination which is operable by the tool;
a collet sleeve rotationally fixed and axially movable relative the outer housing, the collet sleeve comprising internal threads for cooperation with the external threads on the screw element and a plurality of collet fingers for connection to the fluid connection interface; and
a fluid line insert connectable to a fluid line and comprising a groove for a coupler;
wherein the outer housing, the screw element and the collet sleeve are arranged such that:
a rotation of the screw element in a first direction results in an axial movement of the outer housing relative the collet sleeve, and thus the collet fingers, in a first axial direction; and
a rotation of the screw element in a second direction, opposite of the first rotational direction, results in an axial movement of the outer housing relative the collet sleeve, and thus the collet fingers, in a second direction, which is opposite to the first axial direction;
wherein the outer housing comprises a radial through-going opening and the collet sleeve comprises at least one recess between neighboring collet fingers, and wherein the through-going opening and the at least one recess are configured such that, when connected, the fluid line insert extends radially through the through-going opening and the at least one recess;
wherein the method comprises the steps of:
radially positioning the fluid line insert into the through-going opening of the outer housing and the at least one recess of the collet sleeve;
positioning a coupler inside the flow bore and the groove of the fluid line insert;

providing the single line quick connector with the collet fingers in a disengaged position;

moving the single line quick connector relative to the fluid connection interface into a position where the collet fingers snap onto or over the fluid connection interface;

rotating the screw element in a first direction resulting in an axial movement of the outer housing relative the collet sleeve, and thus the collet fingers, to an engaged position where the collet fingers are locked around the fluid connection interface; and connecting the fluid line to the fluid line insert.

12. The method according to claim 11, wherein disengagement of the single line quick connector from the fluid connection interface comprises the steps of:

rotating the screw element in a second direction, opposite of the first rotational direction, resulting in an axial movement of the outer housing relative the collet sleeve, and thus the collet fingers, to a disengaged position where the collet fingers are unlocked from the fluid connection interface.

13. A method of overriding a malfunctioning single line quick connector which is in an engaged position in which it is locked to a fluid connection interface on a component, the single line quick connector comprising:

an outer housing comprising a tool interface at one axial end thereof for operation by a tool;

a flow bore for fluid connection with the fluid connection interface;

a screw element rotationally movable and axially fixed relative the outer housing, the screw element extending in a longitudinal direction of the connector and comprising external threads along a part of its axial length and a termination which is operable by the tool;

a collet sleeve rotationally fixed and axially movable relative the outer housing, the collet sleeve comprising internal threads for cooperation with the external threads on the screw element and a plurality of collet fingers for connection to the fluid connection interface; and a fluid line insert connectable to a fluid line and comprising a groove for a coupler;

wherein the outer housing, the screw element and the collet sleeve are arranged such that:

a rotation of the screw element in a first direction results in an axial movement of the outer housing relative the collet sleeve, and thus the collet fingers, in a first axial direction; and a rotation of the screw element in a second direction, opposite of the first rotational direction, results in an axial movement of the outer housing relative the collet sleeve, and thus the collet fingers, in a second direction, which is opposite to the first axial direction;

wherein the outer housing comprises a radial through-going opening and the collet sleeve comprises at least one recess between neighboring collet fingers, and wherein the through-going opening and the at least one recess are configured such that, when connected, the fluid line insert extends radially through the through-going opening and the at least one recess;

wherein the method comprises the steps of:

providing a milling tool on a tool;

utilizing said milling tool to mill an annular groove around the screw element at least over a distance equal to a travel distance of the collet sleeve to thereby loosen the axially fixed relationship of the screw element relative the outer housing; and utilizing a pushing tool to axially move the outer housing relative the screw element and the collet sleeve to the disengaged position.

\* \* \* \* \*